(12) United States Patent
Followell

(10) Patent No.: US 8,706,446 B2
(45) Date of Patent: Apr. 22, 2014

(54) AUTOMATED TIRE INSPECTIONS UTILIZING CONDUCTIVE FILAMENTS

(75) Inventor: David A. Followell, Wildwood, MO (US)

(73) Assignee: The Boeing Company, Chicago, IL (US)

(*) Notice: Subject to any disclaimer, the term of this patent is extended or adjusted under 35 U.S.C. 154(b) by 444 days.

(21) Appl. No.: 12/869,371

(22) Filed: Aug. 26, 2010

(65) Prior Publication Data

US 2012/0053849 A1 Mar. 1, 2012

(51) Int. Cl.
*G06F 11/30* (2006.01)

(52) U.S. Cl.
USPC .......................................................... 702/183

(58) Field of Classification Search
USPC ................ 702/34, 35, 57, 183, 188; 340/438; 152/152.1
See application file for complete search history.

(56) References Cited

U.S. PATENT DOCUMENTS

| 2,301,251 | A | 11/1942 | Capen |
| 3,934,144 | A | 1/1976 | Green et al. |
| 4,032,785 | A | 6/1977 | Green et al. |
| 5,987,978 | A | 11/1999 | Whitehead |
| 6,951,233 | B1* | 10/2005 | Calvar et al. ............... 152/152.1 |
| 2005/0061069 | A1* | 3/2005 | Robert ............................. 73/146 |
| 2005/0242935 | A1* | 11/2005 | Kafrawy ....................... 340/438 |
| 2007/0279827 | A1 | 12/2007 | Sinnett et al. |
| 2010/0094566 | A1 | 4/2010 | Grant et al. |

FOREIGN PATENT DOCUMENTS

| DE | 19745734 A1 | 4/1999 |
| DE | 102008058882 A1 | 6/2010 |
| GB | 2243584 A | 6/1991 |
| GB | 2265586 A | 6/1993 |
| WO | 03076953 A2 | 9/2003 |
| WO | 2004050391 A1 | 6/2004 |
| WO | 2004068095 A1 | 8/2004 |
| WO | 2007002266 A2 | 1/2007 |

OTHER PUBLICATIONS

International Search Report and Written Opinion of PCT/US2011/030185 dated Jun. 29, 2011; 11 pages.
International Search Report and Written Opinion of PCT/US2011/030177 dated Jul. 1, 2011; 10 pages.

* cited by examiner

*Primary Examiner* — Mohamed Charioui
(74) *Attorney, Agent, or Firm* — Armstrong Teasdale LLP

(57) ABSTRACT

Methods and systems are provided for monitoring a structural health of an object. A conductivity of at least one filament associated with the object is determined, and a structural health parameter associated with the object is determined based on the determined conductivity of the at least one filament.

14 Claims, 4 Drawing Sheets

AUTOMATED TIRE INSPECTIONS UTILIZING CONDUCTIVE FILAMENTS

BACKGROUND

The present disclosure relates generally to structural health monitoring and, more particularly, to inspecting an object utilizing conductive filaments.

Depending on the field and technology, known objects may be routinely inspected to determine whether any weaknesses and/or conditions that could adversely impact and/or limit the structural health of the object have developed. Such inspections may be completed using visually, mechanically, and/or chemically driven technologies. For example, aircraft tires are typically visually inspected by certified mechanics on a periodic basis to determine whether the tires are suitable for use. Such visual inspections are often time-consuming and, because of the subjectivity of the inspector, such inspections may be difficult to duplicate. As a result, visually inspecting each aircraft tire could create undesirable delays and/or expenses. Moreover, assigning a certified mechanic to each airport and/or aircraft may be cost-prohibitive.

BRIEF DESCRIPTION

In one aspect, a method is provided for monitoring a structural health of an object. The method includes determining a conductivity of at least one filament associated with the object and determining a structural health parameter associated with the object based on the determined conductivity of the at least one filament.

In another aspect, a computing device is provided for determining a structural health of an object. The computing device is programmed to determine a conductivity of at least one filament associated with the object, and determine a structural health parameter associated with the object based on the determined conductivity of the at least one filament.

In yet another aspect, a system is provided for determining a structural health of an object. The system includes at least one filament coupled to the object and a computing device. The computing device is programmed to determine a conductivity of the at least one filament associated with the object, and determine a structural health parameter associated with the object based on the determined conductivity of the at least one filament.

The features, functions, and advantages that have been discussed can be achieved independently in various embodiments of the present invention or may be combined in yet other embodiments further details of which can be seen with reference to the following description and drawings.

DETAILED DESCRIPTION

The subject matter described herein relates generally to structural health monitoring systems and more particularly to methods and systems for monitoring an object utilizing conductive filaments. In one embodiment, a tire is embedded with conductive filaments. The electrical conductivity of the conductive filaments is determined by the state of the tire's wear or damage to which the tire has been subjected. As such, the electrical conductivity of the conductive filaments may be indicative of a structural health of the tire. Although the present disclosure is described in the context of monitoring a tire, it should be understood that the subject matter described herein may be used in other contexts in which it is desirable to monitor a structural health of an object.

Exemplary technical effects of the methods, systems, and computer-readable media described herein include at least one of: (a) stimulating at least one filament, (b) determining a conductivity of the at least one filament; (c) determining a structural health parameter associated with the object based on the determined conductivity; (d) comparing the structural health parameter to a predefined threshold; and (e) monitoring a continuity of the at least one filament.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
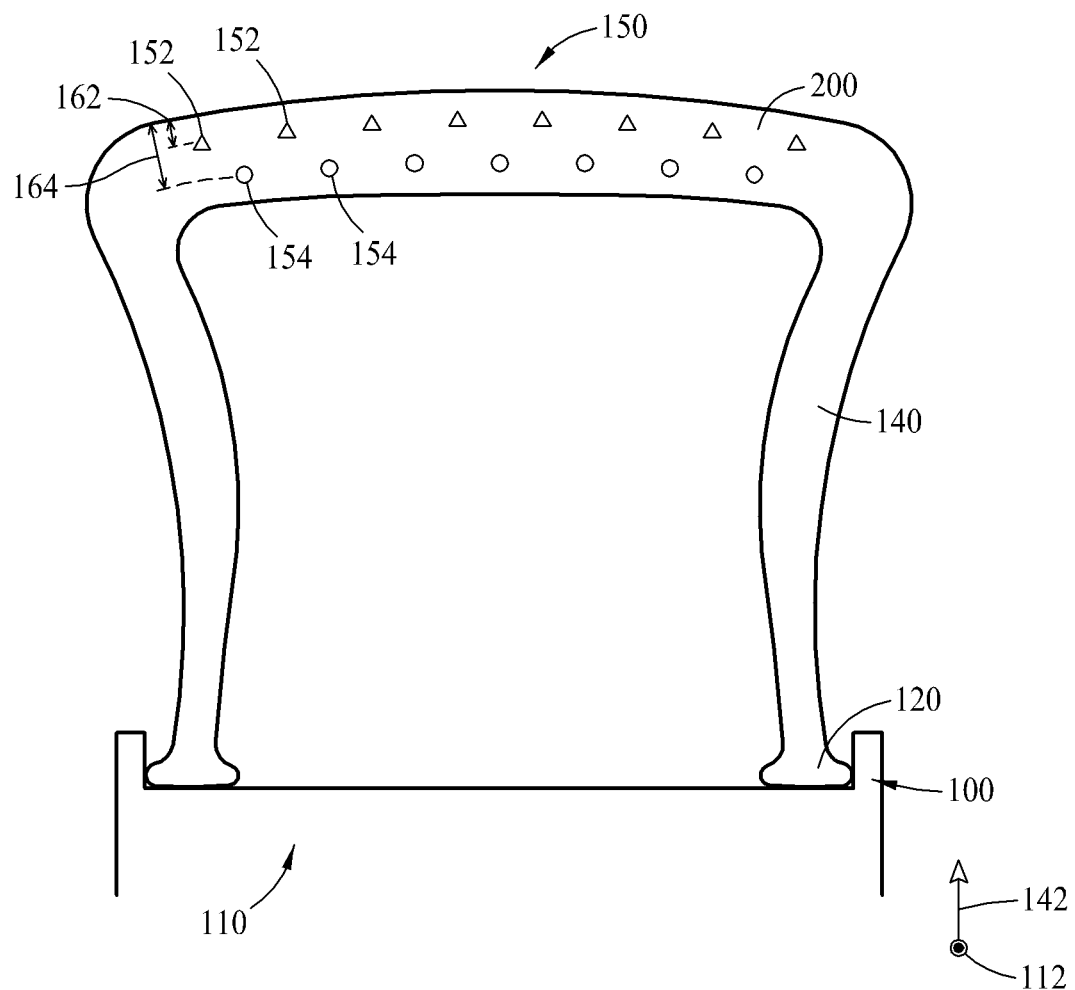
FIG. 1 is a cross-sectional view of an exemplary tire that may be inspected.

FIG. 1 is a cross-sectional view of an exemplary tire 100 that may be monitored. Alternatively, objects other than tire 100 may be monitored. In the exemplary embodiment, tire 100 has a toroidal body sized to fit about a wheel rim 110 along a circumferential axis 112. In the exemplary embodiment, tire 100 includes a bead 120, a tread 130, and a sidewall 140 that extends between bead 120 and tread 130. Bead 120, tread 130, and sidewall 140 extend about wheel rim 110 along circumferential axis 112. In the exemplary embodiment, bead 120 and/or sidewall 140 facilitates supporting tread 130 along a radial axis 142, which enables tire 100 to generate traction against a surface (not shown) during use.

In the exemplary embodiment, a plurality of filaments 150 are coupled to tire 100. In the exemplary embodiment, filaments 150 are conductive and conduct electricity therethrough. Moreover, in the exemplary embodiment, filaments 150 are substantially uniformly spaced about tire 100 along circumferential axis 112. In one embodiment, filaments 150 may be embedded within tire 100 at varying depths of tread 130. For example, in the exemplary embodiment, a plurality of first filaments 152 are disposed at a first depth 162, and a plurality of second filaments 154 are disposed at a second depth 164. Moreover, in at least some embodiments, filaments 152 and/or 154 may be positioned in varying densities.

In the exemplary embodiment, an electrical conductivity of each filament 150 may be disrupted during the operating life of tire 100. More specifically, in the exemplary embodiment, as tire 100 is used and/or damaged, filament(s) 150 may become increasingly exposed, thus increasing a potential for wear, damage, severing, and/or any other interference to filament 150. As such, an electrical conductivity of filaments 150 reduce as tire 100 wears beyond a certain tread depth and/or is damaged. As described in more detail below, in the exemplary embodiment, a structural health parameter of tire 100 may be determined based on a conductivity of filaments 152 and/or 154.

Figure 2:
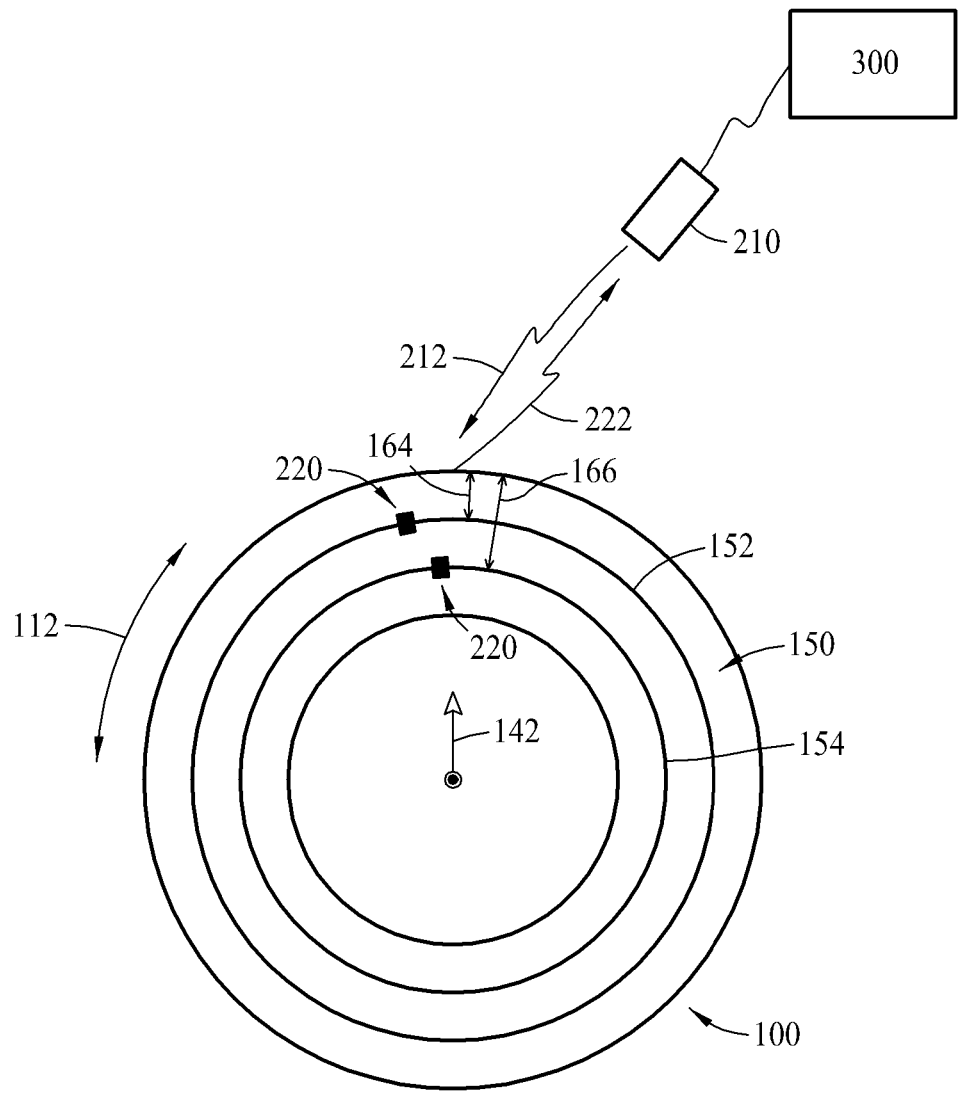
FIG. 2 is an exemplary system that may be used to monitor the structural health of the tire shown in FIG. 1.

FIG. 2 is an exemplary system 200 that may be used to monitor the structural health of an object, such as tire 100. In the exemplary embodiment, system 200 includes a reader 210 and a computing device 300. In the exemplary embodiment, reader 210 is communicatively coupled to at least one filament 150 coupled to and/or embedded in tire 100 via an identification tag 220 coupled to filament 150.

In the exemplary embodiment, reader 210 transmits an interrogation signal toward tire 100 and, more specifically, toward identification tag 220. Moreover, in the exemplary embodiment, reader 210 receives a response signal from identification tag 220. In one embodiment, reader 210 is a radio frequency identification (RFID) reader. In the exemplary embodiment, reader 210 is communicatively coupled to computing device 300 such that communication signals may be transmitted between reader 210 and computing device 300.

Figure 3:
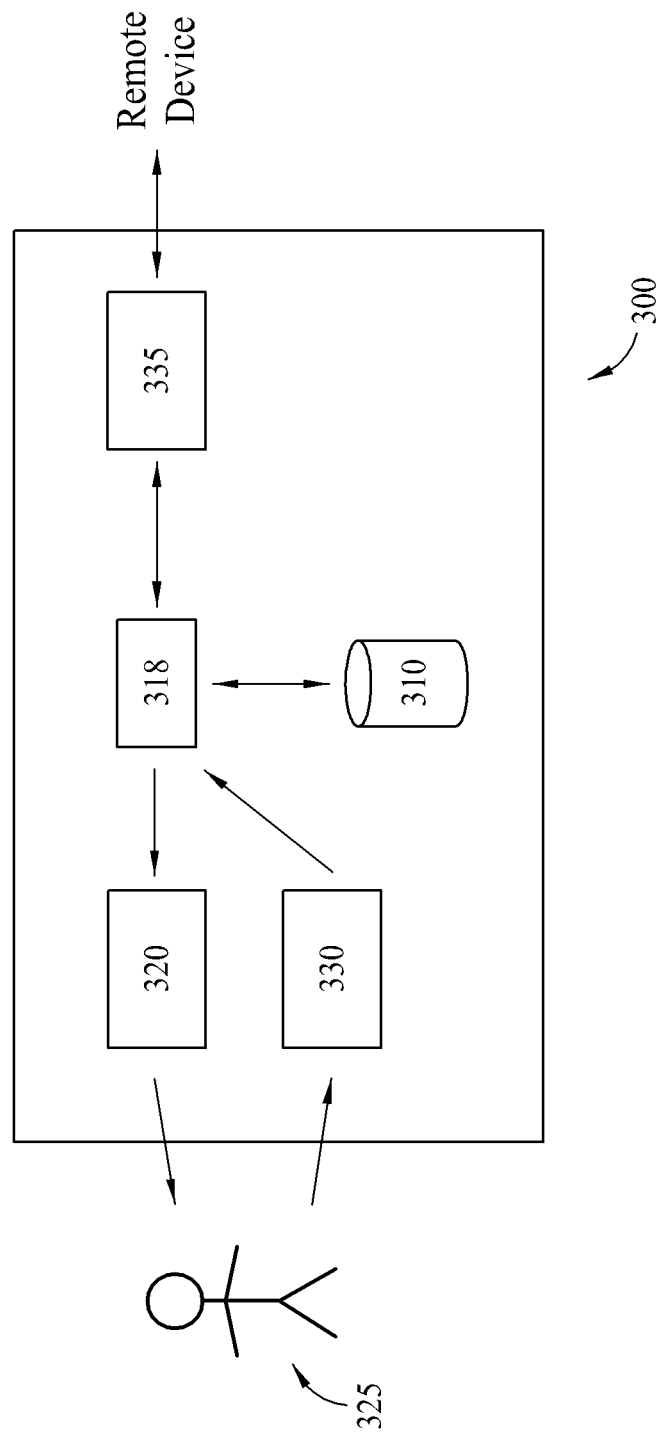
FIG. 3 is block diagram of an exemplary computing device that may be used with the system shown in FIG. 2.

FIG. 3 is block diagram of computing device 300 including a memory device 310 and a processor 318 coupled to memory device 310 for executing programmed instructions. Processor 318 may include one or more processing units (e.g., in a multi-core configuration). In one embodiment, executable instructions and/or structural health data are stored in memory device 310. For example, in the exemplary embodiment, memory device 310 stores software for use in interpreting the conductivity of filaments 150 to determine a structural health parameter of tire 100. Computing device 300 is programmable to perform one or more operations described herein by programming memory device 310 and/or processor 318. For example, processor 318 may be programmed by encoding an operation as one or more executable instructions and providing the executable instructions in memory device 310.

Processor 318 may include, but is not limited to, a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

Memory device 310, as described herein, is one or more devices that enable information such as executable instructions and/or other data to be stored and retrieved. Memory device 310 may include one or more computer readable media, such as, without limitation, dynamic random access memory (DRAM), static random access memory (SRAM), a solid state disk, and/or a hard disk. Memory device 310 may be configured to store, without limitation, executable instructions, structural health data, and/or any other type of data suitable for use with the methods and systems described herein.

In the exemplary embodiment, computing device 300 includes a presentation interface 320 that is coupled to processor 318. Presentation interface 320 outputs (e.g., display, print, and/or otherwise output) information, such as, but not limited to, configuration data, structural health data and/or any other type of data to a user 325. For example, presentation interface 320 may include a display adapter (not shown in FIG. 1) that is coupled to a display device, such as a cathode ray tube (CRT), a liquid crystal display (LCD), a light-emitting diode (LED) display, an organic LED (OLED) display, and/or an "electronic ink" display. In some embodiments, presentation interface 320 includes more than one display device. In addition, or in the alternative, presentation interface 320 may include a printer.

In the exemplary embodiment, computing device 300 includes an input interface 330 that receives input from user 325. For example, input interface 330 may be configured to receive an indication of structural health data and/or any other type of data suitable for use with the methods and systems described herein. As described in further detail below, computing device 300 uses the received input to monitor a structural health of tire 100. In the exemplary embodiment, input interface 330 is coupled to processor 318 and may include, for example, a keyboard, a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 320 and as input interface 330.

In the exemplary embodiment, computing device 300 includes a communication interface 335 coupled to memory device 310 and/or processor 318. Communication interface 335 is coupled in communication with a remote device, such as another computing device 300. For example, communication interface 335 may include, without limitation, a wired network adapter, a wireless network adapter, and/or a mobile telecommunications adapter.

Figure 4:
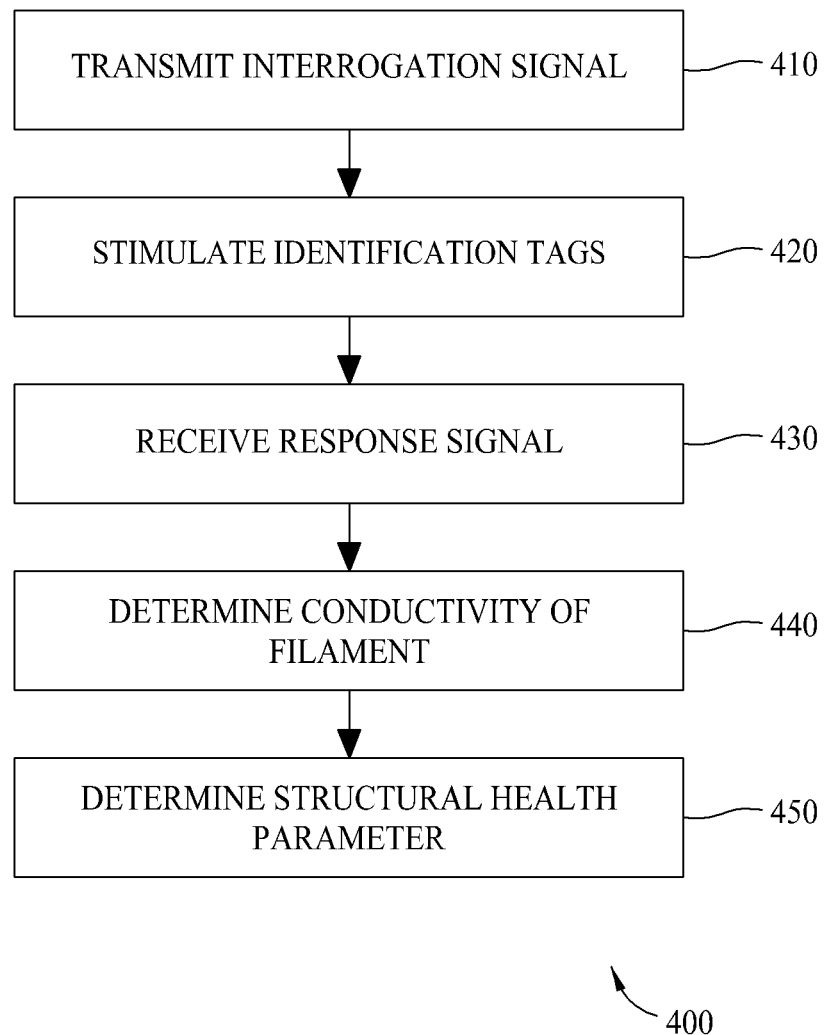
FIG. 4 is a flow chart illustrating an exemplary method for monitoring a structural health of the tire shown in FIG. 1 using the system shown in FIG. 2.

FIG. 4 is a flow chart illustrating an exemplary method 400 for use in monitoring a structural health of tire 100. Initially, in the exemplary embodiment, computing device 300 is programmed to direct reader 210 to transmit 410 an interrogation signal toward tire 100. In the exemplary embodiment, at least one identification tag 220 is stimulated 420 by transmission 410 to transmit a response signal toward reader 210. Particularly, in the exemplary embodiment, the response signal includes conductivity data associated with at least one filament 150. More particularly, in the exemplary embodiment, filaments 152 and/or 154 are each coupled to an identification tag 220 that transmits a respective response signal associated with filament 152 and/or 154.

In the exemplary embodiment, reader 210 receives 430 a response signal transmitted by at least one identification tag 220. For example, in one embodiment, computing device 300 may determine whether any identification tag 220 associated with filaments 152 and/or 154 has transmitted a response signal. In the exemplary embodiment, the response signal includes conductivity data that may be used by computing device 300 to determine a conductivity of filament 150.

Based on the conductivity of filament 150, in the exemplary embodiment, computing device 300 determines a structural health parameter associated with tire 100. The structural health parameter may include an object status, a remaining useful life, and/or a presence of an anomaly. In the exemplary embodiment, each filament 150 may be associated with a predetermined tread depth to facilitate determining the structural health parameter. For example, in the exemplary embodiment, computing device 300 may determine that tire 100 has a "PASS" status if filaments 152 and 154 have a suitable conductivity, a "WARNING" status if any of filaments 152 and 154 has a suitable conductivity and any of filaments 152 and 154 does not have a suitable conductivity, or a "REPLACE" status if none of filaments 152 or 154 has a suitable conductivity.

In one embodiment, the structural health parameter may be compared to at least one predefined threshold associated with the structural health parameter to enable the object status, the remaining useful life, and/or the presence of an anomaly to be determined. Moreover, in at least some embodiments, the structural health parameter may be automatically updated and/or stored within memory device 310.

The above-described systems and methods facilitate automatically monitoring an object to determine whether any weakness and/or condition that could potentially impact the structural health of the object has developed. As such, the embodiments described herein facilitate monitoring the object in remote locations and/or increasing an amount of time between manual inspections. Moreover, the embodiments described herein facilitate inspecting portions of the object that are visually observable. Accordingly, the embodiments described herein enable increased flexibility and/or reduced costs.

The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the invention, including the best mode, and also to enable any person skilled in the art to practice those certain embodiments, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for monitoring a structural health of an object, said method comprising:
    transmitting an interrogation signal toward the object to stimulate a first filament and a second filament associated with the object;
    determining a conductivity of at least one of the first filament and the second filament associated with the object based on a response signal transmitted from the stimulation of the at least one of the first filament and the second filament, the first filament positioned at a first depth relative to the object and the second filament positioned at a second depth relative to the object; and
    determining a structural health parameter associated with the object based on the determined conductivity of the at least one of the first filament and the second filament.

2. A method in accordance with claim 1 further comprising stimulating at least one of the first filament and the second filament within the object.

3. A method in accordance with claim 1, wherein determining a structural health parameter further comprises comparing the structural health parameter to a predefined threshold.

4. A method in accordance with claim 1 further comprising monitoring a continuity of at least one of the first filament and the second filament.

5. A computing device for use in determining a structural health of an object, said computing device programmed to:
    transmit an interrogation signal toward the object to stimulate a first filament and a second filament associated with the object;
    determine a conductivity of at least one of the first filament and the second filament associated with the object based on a response signal transmitted from the stimulation of the at least one of the first filament and the second filament, the first filament positioned at a first depth relative to the object and the second filament positioned at a second depth relative to the object; and
    determine a structural health parameter associated with the object based on the determined conductivity of the at least one of the first filament and the second filament.

6. A computing device in accordance with claim 5 communicatively coupled to a reader, wherein said computing device is further programmed to direct the reader to stimulate at least one of the first filament and the second filament within the object.

7. A computing device in accordance with claim 5 further programmed to compare the structural health parameter to a predefined threshold.

8. A computing device in accordance with claim 5 further programmed to monitor a continuity of at least one of the first filament and the second filament.

9. A system for use in determining a structural health of an object, said system comprising:
    a first filament associated with the object, the first filament positioned at a first depth relative to the object;
    a second filament associated with the object, the second filament positioned at a second depth relative to the object; and
    a computing device programmed to:
        transmit an interrogation signal toward the object to stimulate the first filament and the second filament associated with the object;
        determine a conductivity of at least one of the first filament and the second filament associated with the object based on a response signal transmitted from the stimulation of the at least one of the first filament and the second filament; and
        determine a structural health parameter associated with the object based on the determined conductivity of the at least one of the first filament and the second filament.

10. A system in accordance with claim 9 further comprising a reader communicatively coupled to said computing device, wherein said computing device is further programmed to direct the reader to stimulate at least one of the first filament and the second filament within the object.

11. A system in accordance with claim 9, wherein the first filament and the second filament are uniformly distributed about a circumference of the object.

12. A system in accordance with claim 9 further comprising a reader communicatively coupled to said computing device, wherein said computing device is further programmed to direct said reader to stimulate at least one of the first filament and the second filament.

13. A system in accordance with claim 9, wherein said computing device is further programmed to compare the structural health parameter to a predefined threshold.

14. A system in accordance with claim 9, wherein said computing device is further programmed to monitor a continuity of at least one of the first and the second filament.

* * * * *